(12) United States Patent
Tani et al.

(10) Patent No.: US 7,235,126 B2
(45) Date of Patent: Jun. 26, 2007

(54) INK JET RECORDING INK, INK JET RECORDING INK SET, AND INK JET RECORDING METHOD AND APPARATUS USING THE INK AND THE INK SET

(75) Inventors: Mihoko Tani, Tokyo (JP); Toshitake Yui, Ebina (JP); Ken Hashimoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/869,969

(22) Filed: Jun. 18, 2004

(65) Prior Publication Data
US 2004/0259978 A1 Dec. 23, 2004

(30) Foreign Application Priority Data
Jun. 18, 2003 (JP) ............................. 2003-173050

(51) Int. Cl.
*C09D 11/02* (2006.01)
*G01D 11/00* (2006.01)

(52) U.S. Cl. ............................. 106/31.86; 106/31.75; 347/100

(58) Field of Classification Search ............. 106/31.86, 106/31.75; 347/100
See application file for complete search history.

(56) References Cited

U.S. PATENT DOCUMENTS

| | | | | |
|---|---|---|---|---|
| 6,051,057 A | * | 4/2000 | Yatake et al. | 106/31.58 |
| 6,059,868 A | * | 5/2000 | Kasperchik | 106/31.27 |
| 6,281,267 B2 | * | 8/2001 | Parazak | 523/160 |
| 7,067,590 B2 | * | 6/2006 | Sato et al. | 525/299 |
| 2002/0040660 A1 | * | 4/2002 | Momose | 106/31.75 |
| 2004/0119801 A1 | * | 6/2004 | Suzuki et al. | 347/100 |
| 2004/0244645 A1 | * | 12/2004 | Doi et al. | 106/31.58 |
| 2005/0157131 A1 | * | 7/2005 | Iinuma et al. | 347/100 |

FOREIGN PATENT DOCUMENTS

| | | | |
|---|---|---|---|
| JP | 08245914 A | * | 9/1996 |
| JP | A 11-80636 | | 3/1999 |
| JP | A 2000-7964 | | 1/2000 |

OTHER PUBLICATIONS

English machine translation of JP 08-245914.*

* cited by examiner

Primary Examiner—J. A. Lorengo
Assistant Examiner—Veronica Faison-Gee
(74) Attorney, Agent, or Firm—Oliff & Berridge, PLC

(57) ABSTRACT

An ink jet recording ink is provided containing water, a pigment that is self-dispersible in water, a water-soluble organic solvent, and a nonionic polymer of which the amount is preferably in a range of about 5% by mass to about 200% by mass relative to the total mass of the pigments. The nonionic polymer is preferably selected from a group consisting of polyvinyl alcohol, polyvinyl pyrrolidone, polyacrylamide, poly N-vinyl acetamide, and the like. The absolute value of zeta potential of the ink is preferably in the range of about 5 mV to about 30 mV.

5 Claims, 2 Drawing Sheets

INK JET RECORDING INK, INK JET RECORDING INK SET, AND INK JET RECORDING METHOD AND APPARATUS USING THE INK AND THE INK SET

CROSS-REFERENCE TO RELATED APPLICATION

This application claims priority under 35 USC 119 from Japanese Patent Application No. 2003-173050, the disclosure of which is incorporated by reference herein.

BACKGROUND OF THE INVENTION

1. Field of the Invention

The present invention relates to an ink jet recording ink, an ink jet recording ink set, and an ink jet recording method and apparatus using the ink and the ink set.

2. Description of the Related Art

The principle of ink jet recording systems is that liquid or melted solid ink is jetted out through nozzles, slits, porous films or the like onto recording media such as paper, cloth, film and the like to thereby record images and others on the media. These recording systems provide various advantages in that they are small in size, inexpensive in price, and quiet in operation, and they have come onto the market as a monochrome printer that forms black images and a color printer that provides full-color images. Among these, a so-called piezoelectric ink jet recording system using a piezoelectric element, or a so-called thermal ink jet recording system in which liquid droplets are formed by applying thermal energy for recording has many advantages such as high speed printing, high resolution printing and the like.

The ink used in the ink jet recording apparatuses must be able to achieve the following:
(1) provide images having high resolution, high density and uniformity, without bleeding or fogging on paper;
(2) cause no clogging at the tip of a nozzle due to dried ink, and exhibiting good ejecting response and good ejecting stability;
(3) provide excellent drying characteristics on paper.
(4) provide good fastness of images; and
(5) provide good long-term storage stability.

Various proposals have been made to satisfy the above demands.

Conventionally, of those types of ink, aqueous ink that contains a water-soluble dye is the mainstream of ink jet recording ink. Since, however, such a dye is soluble in water, problems of water resistance and light fastness occur, and an aqueous ink does not necessarily provide satisfactory stability in the storage of images. On the other hand, inks using a pigment as a color material offer promising prospects insofar that both water resistance and light fastness can be improved. Various proposals have therefore been made with regard to inks containing a pigment, and several have been put into practical use.

However, while a pigment ink does produce an improvement in terms of fastness to water, it also has a drawback insofar that it tends to aggregate if it is stored for a long period of time, or at a high temperature, and storage stability of the pigment ink thus becomes a problem. Further, optical density and dispersion stability have a diametrically-opposed relationship, caused by the strength of the cohesive force of pigments. Although a high optical density can be obtained as a result of the aggregation of pigments on paper after printing, the strong cohesive force also results in a deterioration in dispersion stability.

Among attempts to achieve both dispersion stability and high optical density in an aqueous pigment ink for ink jet recording, a technique has been proposed that sets a range based on a relationship between an average particle size of a pigment and a blackness index (for example, see JP-A No. 11-80636). However, the range specified in that application makes it difficult to use effectively a pigment whose average particle size is relatively large. Also, for the same purpose, a method has been proposed of using two or more types of black ink at the same time (see JP-A No. 2000-7964). However, this method also has a drawback insofar that, although it does produce an improvement in optical density, the structure becomes complicated because two or more types of black ink are used at the same time.

Among methods adopted to obtain high optical density, have been: (i) increasing the density of a pigment in an ink; (ii) increasing the hydrophobic property of a dispersing agent; (iii) reducing an amount of dispersing agent added; (iv) increasing an amount of oil absorption in a pigment; and the like. However, in method (i), the storage stability of the ink deteriorates because of the aggregation of pigments, and clogging of the ink head has also tended to deteriorate. Further, all of methods (ii) to (iv) have drawbacks insofar that storage stability, particularly, storage stability at a high temperature, tends to deteriorate, and in some instances, this tendency is pronounced. For this reason, in order to secure dispersion stability, it has been necessary to adopt a method with conditions opposite to those required for increasing optical density, and up to the present, high optical density and dispersion stability have not been achieved simultaneously.

Accordingly, the present invention has been made to provide: a pigment-dispersion ink jet recording ink, which secures a high optical density while dispersion stability of the pigment is maintained, which does not cause clogging in either an ink flow channel or in a nozzle portion at the time of printing, and which also has excellent printing qualities such as fixing strength, water resistance, and light fastness; an ink set that includes such an ink; and an ink jet recording method and apparatus using the ink and the ink set.

SUMMARY OF THE INVENTION

The present inventors have accomplished the present invention after discovering during the course of their research that when a specific type of nonionic polymer is added to an ink jet recording ink, dispersion stability and excellent printing characteristics can be achieved at the same time.

A first aspect of the present invention is to provide an ink jet recording ink containing water, a pigment that is self-dispersible in water, a water-soluble organic solvent, and a nonionic polymer.

A second aspect of the present invention is to provide an ink jet recording ink set including at least the three color inks of cyan, magenta and yellow, and a black ink, in which the black ink is the ink of the present invention, and a difference in pH between at least one of the color inks and the black ink is about 1.5 or greater.

A third aspect of the present invention is to provide an ink jet recording ink set including at least the three color inks of cyan, magenta and yellow, and a black ink, in which the black ink is the ink of the present invention, and at least one of the color inks contains no less than about 100 ppm of at least one type of metal selected from the group consisting of Mg, Ca, Ba, Cu, Co, Ni, Zn, Fe, Al, La, Nd, Y, Pr, Sm, Sb, and In.

A fourth aspect of the present invention is to provide an ink jet recording method in which an image is recorded by discharging the ink jet recording ink of the present invention, or each ink of the ink jet recording ink set of the present invention, onto a surface of a recording material.

A fifth aspect of the present invention is to provide an ink jet recording apparatus using the ink jet recording ink of the present invention, or each ink of the ink jet recording ink set of the present invention, which apparatus comprises a liquid discharging member that applies the ink jet recording ink of the present invention, or each ink of the ink jet recording ink set of the present invention onto a surface of a recording material.

DETAILED DESCRIPTION OF THE INVENTION

Figure 1:
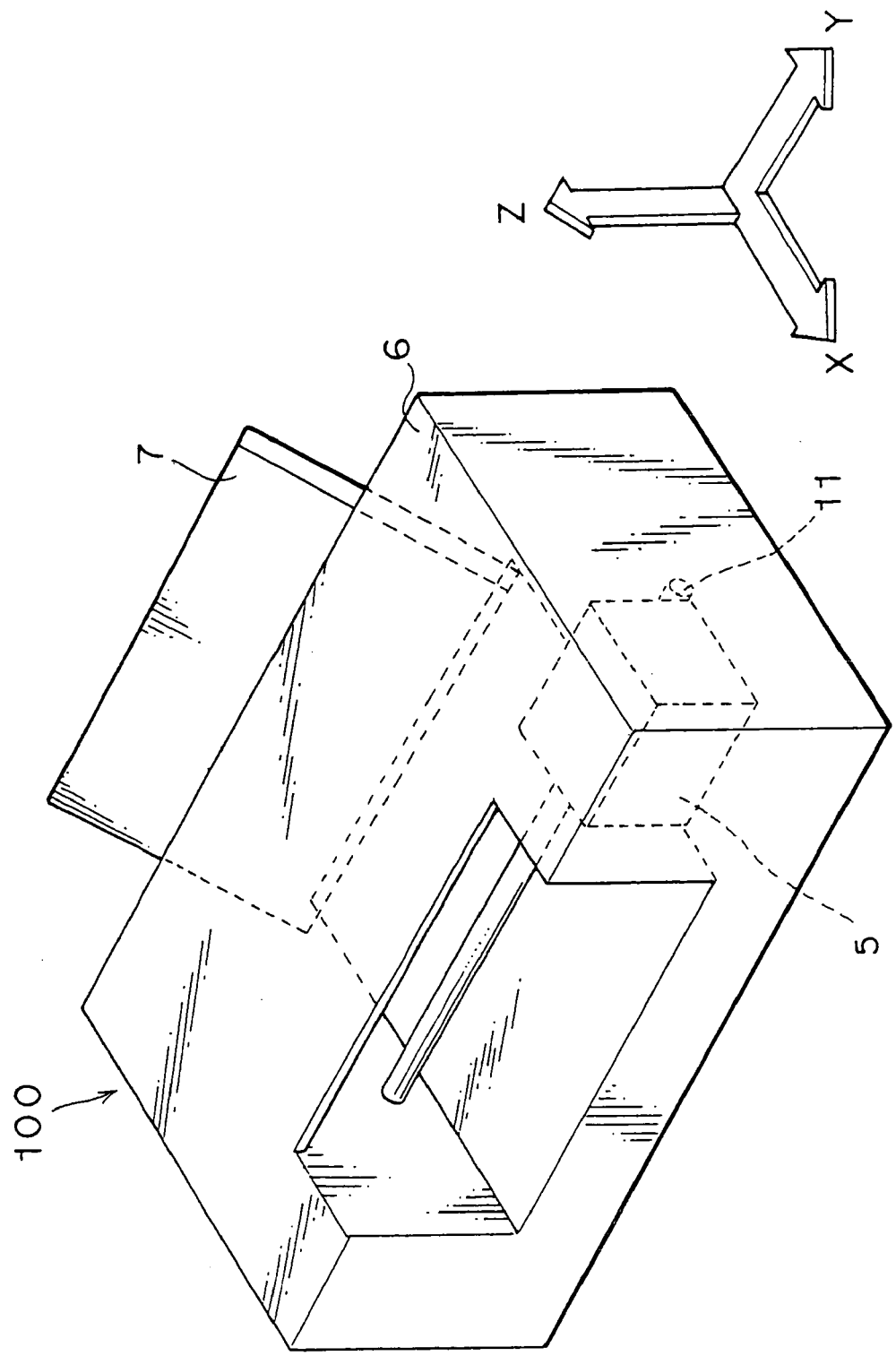
FIG. 1 is a perspective view showing the external structure of an ink jet recording apparatus according to a preferred embodiment of the present invention.

The present invention will be hereinafter described in detail.

The ink jet recording ink of the present invention comprises, as the essential components, at least water, a pigment that is self-dispersed in water, a water-soluble organic solvent, and a nonionic polymer.

In order to achieve a high optical density of ink, it is effective to add a water-soluble polymer to the ink so as to facilitate aggregation of pigments on a recording material such as paper. In the present invention, a water-soluble nonionic polymer is used. As a result, the aggregative property of a pigment and the dispersion stability of the pigment in an ink system can both be achieved. When a cationic polymer, or an anionic polymer, is dissociated into an ion in water, the electrical conductivity of the ink intensifies, and a deterioration in dispersion stability occurs. Accordingly, when either of these two types of polymer is used as the water-soluble polymer, any water-soluble polymer other than a nonionic polymer is not suitable.

In the present invention, zeta potential is preferably used as an index of the dispersion stability of a pigment ink. Zeta potential is a difference in potential that depends on an electric double layer in which, in a system in which a solid is dispersed in a liquid, when a surface of a solid phase has a free charge, a charged layer of an opposite charge appears in a liquid phase in the vicinity of a solid phase interface so as to maintain electrical neutrality.

The higher the absolute value of zeta potential, the better the dispersion stability of the pigment ink, and the lower the absolute value of zeta potential, the higher the degree of aggregation of pigments. Due to the existence of the nonionic polymer in the ink, the dispersion stability of the ink can be enhanced, and the present inventors have discovered that even an ink with a zeta potential, as low as an absolute value close to 5, can also be used to effect. Further, it is preferable that the upper limit of the value of zeta potential be about 30 mV or less. In the case of a pigment ink in which the absolute value of the zeta potential is in a range of about 10 mV to about 25 mV, the influence of the addition of the nonionic polymer in securing a high degree of both dispersion stability and optical density is particularly pronounced.

[Zeta Potential]

Zeta potential, a requirement for characterizing the ink jet recording ink of the present invention, will be hereinafter described.

As methods for measuring the zeta potential, several methods are known; for example, there are: a measuring method by electrophoresis, Electrokinetic Sonic Amplitude method (ESA method), Ultrasonic Vibration Potential method (UVP method) and the like. In the present invention, ESA method that allows measurement without diluting a concentrated solution such as an aqueous ink jet recording liquid is used to measure the zeta potential. The measuring theory of the ESA method is as described below. That is, when alternating electric fields are applied to a dispersed solution, dispersed materials move electrophoretically by these alternating electric fields. By measuring pressure generated by this electrophoresis using a piezoelectric element, the zeta potential can be obtained in accordance with the following formula.

$$\text{Zeta potential} = ESA \cdot \eta \cdot G(\alpha) - 1/\epsilon \cdot c \cdot \Delta\rho \cdot V$$

Wherein ESA is a value obtained by measurement, and indicates the pressure per unit electric field. $\eta$ represents the viscosity of the solvent, $G(\alpha)-1$ represents the correction factor of an operation of the force of inertia, $\epsilon$ represents the dielectric constant of the solvent, c represents the speed of sound in the solvent, $\Delta\rho$ represents the density difference between the solvent and particles, and V represents the volume proportion of the particles. An investigation of the above-described parameters has been carried out, and since it has been judged that the viscosity of the ink can be used for $\eta$, the dielectric constant of water for $\epsilon$, the density difference between the coloring material and water for $\Delta\rho$, and the volume proportion of the coloring material for V, it has been decided to determine the zeta potential by using these parameters in the present invention.

In the present invention, to measure the zeta potential, ESA-8000 (manufactured by Matec Applied Science Co.) is used as a measuring apparatus, and a measurement cell is filled with 400 ml of the aqueous ink jet recording liquid, and measurement is carried out in accordance with a predetermined measuring method in a state in which a measuring probe is immersed in a prescribed amount.

The effects of the ink jet recording ink of the present invention become more pronounced when it is used as a black ink which makes a major contribution to the sharpness and quality of an image in image recording.

Further, even when the ink of the present invention is used for an ink jet recording ink set including at least the three color inks of cyan, magenta and yellow, and a black ink, it is preferable to use the ink of the present invention as the black ink from a viewpoint of effectiveness.

As a more preferable embodiment, when an image or the like is printed in a black image portion by using the black ink of the present invention in combination with, and at the same time as, the other color inks, the difference in pH between at least one of the other color inks, and the black ink, is about 1.5 or more, and the pH of the color ink used together with the black ink is lower than that of the black ink.

Further, as another preferable embodiment, at least one of the other color inks used in combination with the black ink according to the present invention contains about 100 ppm or more of ions of at least one kind of polyvalent metal, particularly, divalent or superior metal ions, derived from a metal selected from the group consisting of Mg, Ca, Ba, Cu, Co, Ni, Zn, Fe, Al, La, Nd, Y, Pr, Sm, Sb, and In.

The present inventors have also discovered that these preferable embodiments have the effect of improving the density of a printed image, and particularly when a black ink is the ink jet recording ink of the present invention, the fixing property of the ink is further improved by the influence of the nonionic polymer.

Next, a description will be given of various materials that make up the ink jet recording ink of the present invention.

The ink of the present invention includes, as the essential components, water, a pigment that is self-dispersible in water, a water-soluble organic solvent, and a nonionic polymer. First, the pigment that is self-dispersible in water will be described. The color hue of the ink of the present invention is not limited, but a black pigment used for a black ink that is a preferable aspect of the present invention will be described as an example.

[Black Pigment]

A self-dispersible pigment used as a coloring agent in the ink of the present invention has a hydrophilic functional group at the surface thereof, and hence, refers to a pigment that is dispersible by itself in a solvent in the absence of a polymer dispersing agent. In the present invention, a determination as to whether the pigment is self-dispersible or not is confirmed by the following self-dispersibility test.

<Test for Determining Self-Dispersibility>

A test pigment is added to and dispersed in water in the absence of a dispersing agent, using an ultrasonic homogenizer, a nanomizer, a microfluidizer, a ball mill or the like, followed by diluting with water to bring an initial pigment concentration to about 5%. The initial pigment concentration, and the concentration of a pigment in a supernatant (a dispersing liquid by 10% from a liquid surface in a depthwise direction of the liquid), 100 g of the resultant dispersion is charged into a glass bottle having a diameter of 40 mm and maintained standing for 1 day, are determined. When a ratio of the pigment concentration determined after 1 day standing, relative to the initial pigment concentration, (hereinafter referred to as "self-dispersibility index") is about 98% or higher, it is rated as "self-dispersible".

During this evaluation, the method for determining the concentration of the pigment is not specifically limited to methods, such as those comprising drying samples and measuring a solids content thereof, diluting the samples to an appropriate concentration and measuring the concentration on the basis of the samples which have permeated. If other methods for determining precisely the concentration of the pigment are available, such methods may of course also be used.

As the hydrophilic functional group of the pigment, any hydrophilic functional group including nonionic, anionic and cationic groups may be used. In particular, a carboxylic group, hydroxyl group, sulfonic acid group or phosphoric acid group may be preferably used either singly or in combination of two or more. Among these, a carboxylic group alone or a combination of a carboxylic group with one or more of the above compounds is more preferable.

When the pigment has a carboxylic group, sulfonic acid group or phosphoric acid group, each of these groups may be used in the state of a free acid as it is. However, it is advantageous and desirable that a part or all of the acid form a salt in light of the dispersibility. As materials forming the salt, various basic materials may be used, and preferably, alkali metal, ammonia, or organic onium compound may be used either singly or in combination of two or more.

An amount of the hydrophilic functional groups on the surface of the pigment can be suitably selected in accordance with purposes, because it depends upon the types of the hydrophilic functional group, and upon the types of salt when the functional group forms a salt. However, for instance, in a case in which the hydrophilic group is -COONa group, the amount of the hydrophilic functional groups is desirably from about 0.8 to about 4 mmol/g.

Any of inorganic and organic pigments may be used as the pigment into which the hydrophilic functional group is introduced. As a black pigment, a carbon black pigment such as furnace black, lamp black, acetylene black and channel black is preferable. Examples of compounds which have been made available to the market, may include, but are not limited to, Raven 7000, Raven 5750, Raven 5250, Raven 5000 ULTRA II, Raven 3500, Raven 2500 ULTRA, Raven 2000, Raven 1500, Raven 1250, Raven 1200, Raven 1190 ULTRA II, Raven 1170, Raven 1255, Raven 1080 ULTRA, Raven 1060 ULTRA, Raven 790 ULTRA, Raven 780 ULTRA and Raven 760 ULTRA (manufactured by Colombian Carbon Company); Regal 400R, Regal 330R, Regal 660R, Mogul L, Black Pearls L, Black Pearls 1300, Monarch 700, Monarch 800, Monarch 880, Monarch 900, Monarch 1000, Monarch 1100, Monarch 1300 and Monarch 1400 (manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degussa AG); No. 25, No. 33, No. 40, No. 47, No. 52, No. 900, No. 2300, MCF-88, MA 600, MA 7, MA 8 and MA 100 (manufactured by Mitsubishi Chemical Co., Ltd.); and the like.

Further, magnetic microparticles such as magnetite or ferrite; titanium black; or the like may be used as the black pigment.

To introduce a hydrophilic functional group into the surface of these pigments, any of known methods and newly invented methods may be used. Known treating methods, for example, oxidizing treatments using an oxidizing agent (such as nitric acid, permanganates, bichromates, hypochlorites, ammonium persulfate, hydrogen peroxide, or ozone); treatments using a coupling agent such as silane compounds; polymer grafting treatments; or plasma treatments may be used, and newly developed methods may also be used. These methods may be used in combination.

It is desirable to refine the prepared pigment into which a hydrophilic functional group is introduced, by removing impurities such as oxidizing agents unremoved and other inorganic and organic impurities. Each amount of calcium, iron and silicon in the ink is about 10 ppm or less and preferably about 5 ppm or less. In the present invention, each amount of these inorganic impurities was measured by means of a high frequency induction coupling plasma emission analysis.

These impurities can be removed, for example, by a method of washing with water, a method using a reverse osmosis membrane or an ultrafiltration membrane, an ion exchange method or an adsorbing method using activated carbon or zeolite. These methods may be used either singly or in combination.

As these self-dispersible pigments into which the hydrophilic functional group is introduced, in addition to pigments newly produced for the present invention, commercially available pigments which are made hydrophilic may be used. Examples of the commercially available self-dispersible pigments may be Microjet Black CW-1, Microjet Black CW-2 and Microjet Black CW-3 (manufactured by Orient Chemical Industries Ltd.), and CAB-O-JET 200 and CAB-O-JET 300 (manufactured by Cabot Corporation). Any of these commercially available self-dispersible pigments which are made hydrophilic has an index of self-dispersion of 100% measured by any of the above methods.

The self-dispersible pigment needs to be contained in the ink in a range of about 0.3 to about 20% by mass, and preferably of about 0.5 to about 15% by mass relative to a total amount of ink.

If the amount of the pigment contained in the ink is more than about 20% by mass, the tip of the nozzle tends to become clogged and the abrasion resistance of an image is diminished. On the other hand, if the amount of the pigment contained in the ink is less than about 0.3% by mass, adequate optical density cannot be obtained and variations in the optical density of individual papers become considerable.

[Water-Soluble Organic Solvent]

Examples of materials used as the water-soluble organic solvent for the ink jet recording ink of the present invention include: polyhydric alcohols such as ethylene glycol, diethylene glycol, propylene glycol, dipropylene glycol, butylene glycol, triethylene glycol, 1,5-pentanediol, 1,2,6-hexanetriol, trimethylolpropane, glycerin and polyethylene glycol; lower alcohols such as ethanol, isopropyl alcohol and 1-propanol; nitrogen-containing solvents such as pyrrolidone, N-methyl-2-pyrrolidone, cyclohexylpyrrolidone and triethanolamine; sulfur-containing solvents such as thiodiethanol, thiodiglycerol, sulfolane and dimethyl sulfoxide; propylene carbonate; ethylene carbonate; and sugars sugar-alcohols and their derivatives such as glucose, fructose, galactose, mannose and xylose.

Further, a compound represented by the following formula (1) can be used.

$$R-O-X_nH \quad (1)$$

wherein R is a functional group having 4 to 8 carbon atoms selected from the group consisting of an alkyl group, an alkenyl group, an alkynyl group, a phenyl group, an alkylphenyl group, and alkenylphenyl group and a cycloalkyl group; X is an oxyethylene group or an oxypropylene group; and n is an integer of 1 to 4.

Examples of the compound represented by the above formula (1) include ethyleneglycol monobutyl ether, diethyleneglycol monobutyl ether, propyleneglycol monobutyl ether, diethyleneglycol monohexyl ether, dipropyleneglycol monobutyl ether, triethyleneglycol monobutyl ether, triethyleneglycol monohexyl ether, diethyleneglycol monocyclohexyl ether, triethyleneglycol monophenylethyl ether, dioxypropylene oxyethylene monopentyl ether and the like. Among these, diethyleneglycol monobutyl ether is preferred.

These water-soluble organic solvents may be used either singly or in combination of two or more. An amount of the water-soluble organic solvent is in the range of about 1 to 60% by mass, and preferably in the range of about 5 to about 40% by mass relative to the total amount of the ink. The amount less than about 1% by mass may cause a case in which moisturizing action is not obtained. The amount exceeding about 60% by mass may cause unstable jetting of the ink due to an increase in the viscosity of the ink.

[Nonionic Polymer]

The nonionic polymer that can be used in the present invention is a water-soluble nonionic polymer. Specific examples thereof include, but are not limited to, polyvinyl alcohol, polyvinyl pyrrolidone, polyacrylamide, poly N-vinyl acetamide, polyamines, polyvinyl ethers (polyvinyl methyl ether, polyvinyl ethyl ether, polyvinyl isobutyl ether, and the like), polyalkylene oxides (polyethylene oxide, polypropylene oxide, and the like), polysaccharide such as water-soluble cellulose, alginic acid polyalcohol ester, water-soluble urea resin, dextrin derivative, casein and the like.

Further, in addition to such main chain structures, a graft copolymer having a nonionic polymer structure as a side chain can be suitably used.

The molecular weight of the nonionic polymer preferably has a weight-average molecular weight of about 300 to about 20,000 from the standpoint of the relationship between the viscosity and storage stability of the ink. In the measurement of the weight-average molecular weight, a reduced value of polyethylene glycol measured by a light scattering method, an X-ray small angle scattering method, a sedimentation equilibrium method, a diffusion method, an ultracentrifugation, various chromatography, or a GPC process can be used.

These nonionic polymers can be used either singly or in combination of two or more. The amount of the nonionic polymer contained is preferably in a range of about 5% by mass to about 200% by mass, and more preferably in a range of about 5% by mass to about 100% by mass relative to the total mass of the pigment. If the amount of the nonionic polymer is less than about 5% by mass, there is a tendency for improvements in dispersion stability not be adequate. If, on the other hand, the amount of the nonionic polymer exceeds about 200% by mass, the viscosity of the ink increases and a problem arises that the jetting characteristics of the ink can be thereby adversely affected.

[Water]

The water contained in the ink used for present invention is not particularly limited. It is preferable to use ion exchange water, superpure water, distilled water and ultra-filtered water to avoid the contamination with impurities. The amount of water contained in the ink jet recording ink of the present invention is in the range of about 30 to about 98% by mass, and more preferably in the range of about 50 to about 90% by mass relative to the total amount of the ink.

[Other Additives]

For the purposes of controlling various ink characteristics, including maintenance of jetting stability by means of adjustments to surface tension, and control of permeability (drying time) at the time of printing, the ink jet recording ink of the present invention can, if necessary, include agents such as oxidants, anti-oxidants, reducing agents, enzymes, bactericides, anti-foaming agents, abrasives, mildew-proofing agents, viscosity adjusting agents, electrical conductive agents, UV-absorbers, chelating agents, dispersion dyes, and oil-soluble dyes.

[Color Materials]

As the ink jet recording ink of the present invention, an ink of a color other than black can be used. In these circumstances, pigments for color ink described below, self-dispersible in water and with the same compositions as those of the black ink described above, may be used. Further, when the pigments for color ink are made self-dispersible in water, the same method can be used as that utilized in the case of the black pigment.

An ink set using the ink jet recording ink of the present invention is also a preferable embodiment of the present invention. In this case, an ink set comprised of at least four colors, that is, a combination of a black ink and color inks, may be provided. In these circumstances, the color inks other than the black ink may each be either a pigment ink or a dye ink. The color inks each contain at least water, a color material comprised of a pigment or a dye, and a water-soluble organic solvent, and for the purpose of controlling the characteristics of the ink, may also contain, if necessary, other additives.

Examples of the color pigments used in the case of pigment ink are listed below.

Examples of a cyan color pigment may include, but are not limited to, C.I. Pigment Blue 1, C.I. Pigment Blue 2, C.I. Pigment Blue 3, C.I. Pigment Blue 15, C.I. Pigment Blue 15:1, C.I. Pigment Blue 15:3, C.I. Pigment Blue 15:4, C.I. Pigment Blue 16, C.I. Pigment Blue 22, C.I. Pigment Blue 60 and the like.

Examples of a magenta color pigment may include, but are not limited to, C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184, C.I. Pigment Red 202, C.I. Pigment Violet 1960 and the like.

Examples of a yellow color pigment may include, but are not limited to, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. PigmentYellow 17, C.I. Pigment Yellow 55, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. PigmentYellow 129, C.I. Pigment Yellow 150, C.I. Pigment Yellow 151, C.I. Pigment Yellow 154, C.I. Pigment Yellow 180, C.I. Pigment Yellow 185 and the like.

Besides the pigments of three primary colors of cyan, magenta and yellow, the pigments of predetermined colors such as red, green, blue, brown, white or the like, metallic gloss pigments such as gold, silver or the like, colorless extender pigments, plastic pigments and the like may be used. Further, a pigment that is newly synthesized for use in the present invention may also be used.

In the present invention, a self-dispersible pigment in which a hydrophilic functional group has been introduced onto the surface thereof can also preferably be used. In order to introduce the hydrophilic functional group, the same methods can be utilized as those used for the black pigment described above. Further, the amount of the hydrophilic functional group can be adjusted by controlling factors such as a processing density and a processing time. In addition, a surface functional group of a commercially-available self-dispersible pigment can be adjusted by means of denaturation such as esterification.

The amount of these pigments contained in the color inks used in the present invention is preferably in a range of about 0.1 to about 10% by mass, more preferably in a range of about 1 to about 7% by mass, and further preferably in a range of about 1 to about 5% by mass relative to the total amount of ink. If the amount of the pigments becomes greater, a tendency for clogging at the tip of a nozzle at the time of the evaporation of water becomes worse. On the other hand, if the amount of the pigments is too small, sufficient density cannot of course be obtained. These color materials can be individually used, but also may be used in combination of two or more. In addition to the three primary colors of cyan, magenta and yellow, the materials may also be of custom-made colors.

It is desirable to refine these color materials by removing impurities mixed in during the manufacturing process, such as oxidizing agents that remain, processing agents or by-product materials, and other inorganic and organic impurities. The amount of calcium, iron and silicon in the ink in each case is about 10 ppm or less and preferably about 5 ppm or less. The amount of each of these inorganic impurities can be measured by means of high frequency induction coupling plasma emission analysis. These impurities can be removed, for example, by a method of washing with water, a method using a reverse osmosis membrane or an ultrafiltration membrane, an ion exchange method or an adsorbing method using activated carbon or zeolite. These methods may be used either singly or in combination.

A dye used in the case of a dye ink is preferably a water-soluble dye. Any of an acidic dye, a direct dye, a basic dye and a reactive dye may be used as the water-soluble dye. Among the dyes, the acidic dye and the direct dye are preferable.

Examples of the above dye include, but are not limited to, the following:

C.I. Direct Blue-1, -2, -6, -8, -22, -34, -70, -71, -76, -78, -86, -112, -142, -165, -199, -200, -201, -202, -203, -207, -218, -236, and -287;

C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, and -227;

C.I. Direct Yellow-1, -2, -4, -8, -11, -12, -26, -27, -28, -33, -34, -41, -44, -48, -58, -86, -87, -88, -135, -142, and -144;

C.I. Acid Blue-1, -7, -9, -15, -22, -23, -27, -29, -40, -43, -55, -59, -62, -78, -80, -81, -83, -90, -102, -104, -111, -185, -249, -and -254;

C.I. Acid Red-1, -4, -8, -13, -14, -15, -18, -21, -26, -35, -37, -52, -110, -144, -180, -249, and -257;

C.I. Acid Yellow-1, -3, -4, -7, -11, -12, -13, -14, -18, -19, -23, -25, -34, -38, -41, -42, -44, -53, -55, -61, -71, -76, -78, -79, -122; and the like.

The amount of these dyes contained in the color inks used in the present invention is preferably in a range of about 0.1 to about 20% by mass, more preferably in a range of about 1 to about 10% by mass, and further preferably in the range of about 1 to about 5% by mass relative to the total amount of ink. If the amount of the dyes is too great, clogging at the tip of a nozzle at the time of evaporation of water becomes worse. On the other hand, if the amount of the dyes is too small, sufficient density cannot of course be obtained.

A combination of the ink jet recording ink of the present invention to be used as a black ink, and color inks of other colors, that is, the three color inks of cyan, magenta and yellow, can be used as an ink jet recording ink set. In the ink set of the present invention, as a preferred combination of the black ink of the present invention and other color inks, an embodiment in which the black ink is combined with color inks having a different pH to the black ink, and an embodiment in which the black ink is combined with color inks having a specific metal, are employed.

Next, the ink set of the present invention will be described.

[Ink Set in Which Black Ink is Combined With a Color Ink Having a Low pH]

In a case where the black ink of the present invention is used in combination with a color ink of which the pH is lower than that of the black ink, specifically, a color ink having a difference in pH of about 1.5 or more from the black ink, the pH of the ink is adjusted by adding a pH regulating agent to the ink. Examples of the pH regulating agent include acids such as hydrochloric acid, sulfuric acid, nitric acid, acetic acid, citric acid, oxalic acid, malonic acid, boric acid, phosphoric acid, phosphorous acid, lactic acid and the like, bases such as potassium hydroxide, sodium hydroxide, lithium hydroxide, ammonium hydroxide, triethanolamine, diethanolamine, ethanolamine, 2-amino-2-methyl-1-propanol, ammonia and the like, buffers selected from phosphate, oxalate and aminate, and pH buffers such as Good's buffer and the like.

The pH of the black ink of the present invention used in such combinations as described above is preferably in the range of about 4 to about 11, and more preferably in the range of about 5 to about 10.5. Further, the pH of each of the other color inks used in combination is preferably in the range of about 3 to about 11 and more preferably in the range of about 4 to about 9.5. Even when these conditions are satisfied, the difference in pH between the black ink and the color inks is preferably about 1.5 or more, that is, the pH of each color ink should be lower than that of the black ink by about 1.5 or more. More preferably, the difference in pH should be about 2 or more. A difference in pH of about 1.5 or more causes aggregation of the black pigment at an interface where the black ink and the color ink come into contact with each other, due to the influence of the pH, and a sharp image free from blur is rapidly formed.

Even when the difference in pH falls within a preferred range, the pH of the color ink having a very low value is apt to affect the storage stability of the ink, for example, by causing clogging of the ink. The pH of the color ink having a very high value tends to cause a deterioration in components of the ink head, particularly metal members.

[Ink Set in Which a Black Ink is Combined With a Color Ink Containing a Polyvalent Metal]

Further, as another embodiment of the ink set of the present invention, an ink set is provided in which the black ink of the present invention is combined with metal-containing color inks. In these cases, the metal is preferably a polyvalent metal, and particularly preferably, a divalent, or higher value, metal ion is contained in the color ink. Examples of polyvalent metals added to the color ink include, but are not limited to, metals such as Mg, Ca, Ba, Cu, Co, Ni, Zn, Fe, Al, La, Nd, Y, Pr, Sm, Sb, and In. These materials are preferably added to the ink in the form of a salt such as phosphate, sulphate, nitrate or acetate, and exist in the ink as polyvalent metal ions. The amount of polyvalent metal contained in a color ink, required to secure an improvement in image quality, totals about 100 ppm or more, and preferably about 500 ppm or more. Although the upper limit of the value of the amount cannot be defined as a constant value, because this limit can vary depending on the solubility of polyvalent metal, it is preferable that a polyvalent metal be contained to the extent that autoagglutination is not caused in the pigments in the ink.

When the black ink and the color ink come into contact with each other at the surface of a recording material, black pigments aggregate at the surface as a result of the action of the polyvalent metal, and a sharp image free from blur is rapidly formed.

Other color inks used in combination with the black ink of the present invention contain a color material of a type described above, a pH buffer for adjusting the ink to a predetermined pH, or, in addition to a polyvalent metal of a type described above, a water-soluble organic solvent and water.

Further, these color inks can optionally contain, in the same manner as in the ink of the present invention, additives used for the ink jet recording ink such as surface active agents, oxidizing agents, anti-oxidants, reducing agents, enzymes, bactericides, anti-foaming agents, abrasives, mildew-proofing agents, viscosity adjusting agents, electrical conductive agents, UV absorbers, chelating agents, dispersion dyes, and oil-soluble dyes.

The ink jet recording ink and the ink set using the same have secured a dispersion stability of pigments and a high optical density, as well as an excellent discharge stability at the time of printing. Further, in terms of a range of printing characteristics such as fixing strength, water resistance and light fastness of images obtained are also excellent. Therefore, the ink jet recording ink and the ink set can be used to effect in various technical fields.

[Ink Jet Recording Method]

The ink jet recording method of the present invention is a method in which the above ink jet recording ink, or inks, in the ink jet recording ink set of the present invention are jetted out onto the surface of a recording material and thereby record an image thereon. The ink jet recording ink of the present invention has excellent discharge stability, and therefore, provides excellent printing characteristics in any of the general-purpose ink jet recording systems, including a piezoelectric ink jet recording system and a thermal ink jet recording system.

When the ink set of the present invention is used, color inks are first jetted out onto a recording material, and thereafter, a black ink is jetted out thereupon. This sequence is preferable from the standpoint of obtaining high image quality, for example, high optical density, and for controlling factors such as blur.

[Ink Jet Recording Apparatus]

Further, the ink jet recording apparatus of the present invention includes liquid discharging members which apply to the surface of the recording material the above ink jet recording ink, or inks, in the ink jet recording ink set of the present invention. Such liquid discharging members are preferably an ink head of a thermal ink jet type or of a piezoelectric ink jet type.

Further, the ink jet recording ink of the present invention is excellent in terms of the dispersibility of pigments and discharge stability, and can therefore be used to effect in various recording apparatuses. For example, a recording apparatus equipped with a heater or the like, for supplementing the fixing of the ink onto a recording material (for example, paper), and a recording apparatus equipped with an intermediate transfer mechanism, in which an intermediate body is printed with ink, and the ink is thereafter transferred onto a recording material such as paper, can both be used as the recording apparatus of the present invention.

Referring now to the attached drawings, a preferred embodiment of the ink jet recording apparatus according to the present invention will be hereinafter described in detail. In these drawings, the same members or equivalents will be denoted by the same reference numerals, and overlapping description thereof will be omitted.

Figure 2:
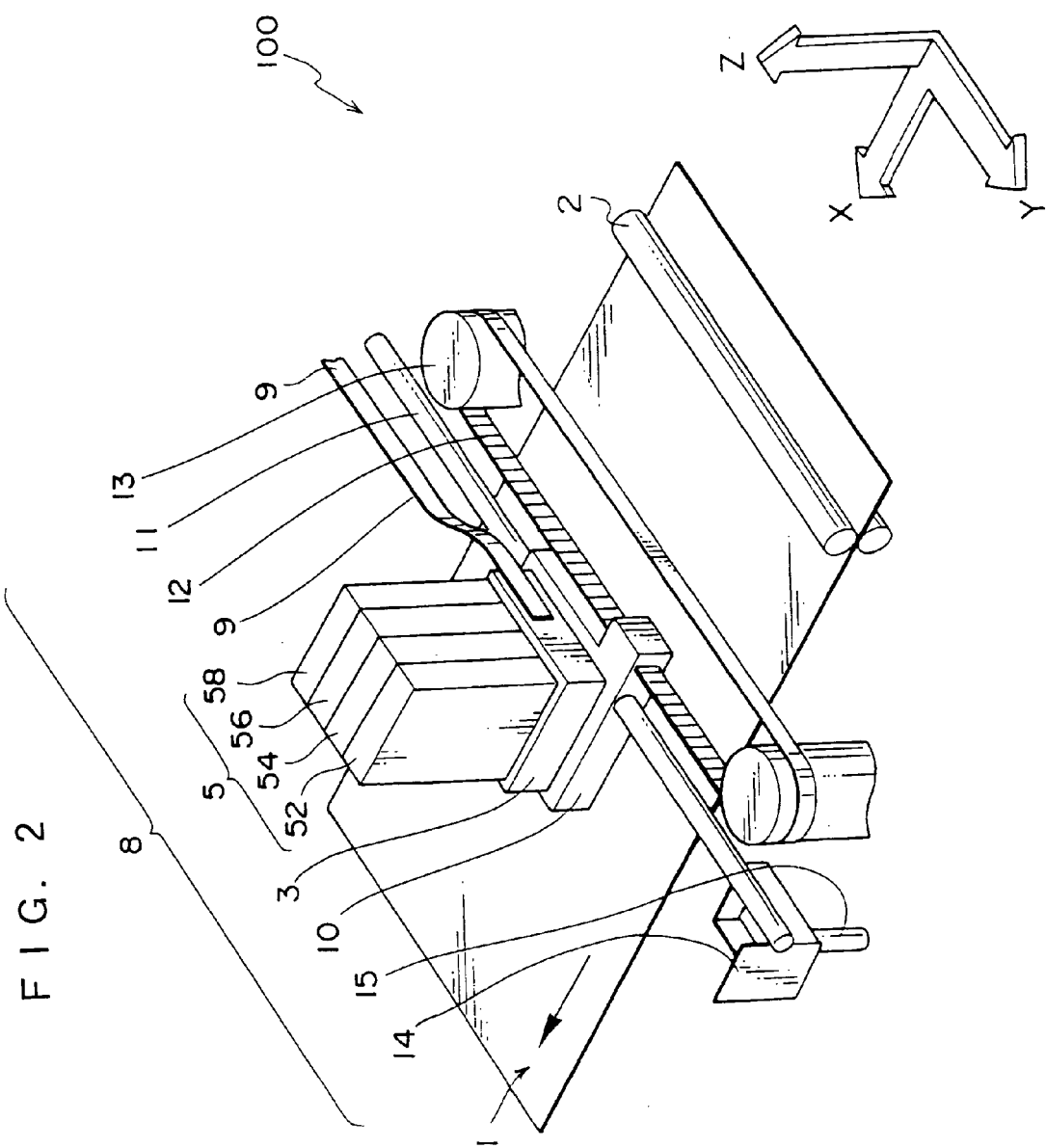
FIG. 2 is a perspective view showing the internal basic structure of the ink jet recording apparatus shown in FIG. 1.

As shown in FIGS. 1 and 2, the ink jet recording apparatus 100 of the present embodiment is configured so as to operate to form an image to be recorded based on the aforementioned ink jet recording method of the present invention. That is, the ink jet recording apparatus 100 is primarily made up of an external cover 6, a tray 7 on which a predetermined amount of recording material 1 such as plain paper can be placed, conveying rollers 2 for conveying the recording material 1 into the ink jet recording apparatus 100, and an image forming section 8 in which an image is formed by discharging ink onto the surface of the recording material 1.

The conveying rollers 2 are formed as a pair of rollers that are disposed in the ink jet recording apparatus 100 in a rotatable manner. The conveying rollers 2 nip the recording material 1 placed on the tray 7, and convey the recording material 1 one by one into the ink jet recording apparatus 100 at a predetermined timing.

The image forming section 8 is primarily made up of a recording head (a liquid discharging member) 3, an ink tank section 5, a power-supply signal cable 9, a carriage 10, a guide rod 11, a timing belt 12, a driving pulley 13, and a maintenance unit 14. In the present embodiment, the recording head 3 is structured as an ink head of a thermal ink jet type or of a piezoelectric ink jet type.

The ink tank section 5 is formed by ink tanks 52, 54, 56 and 58 in which inks of different colors are respectively stored in a dischargeable manner. These ink tanks respectively contain the various inks of the ink jet recording ink set according to the present invention.

Connected to the recording head 3 are the power-supply signal cable 9 and the ink tank section 5. When external image recording information is inputted to the recording head 3 via the power-supply signal cable 9, the recording head 3 absorbs, based on the image recording information, a predetermined amount of ink from each of the ink tanks, and discharges the ink onto the surface of the recording material 1. Incidentally, the power-supply signal cable 9 also supplies, in addition to the image recording information, electric power required for driving the recording head 3.

Further, the recording head 3 is disposed and held on the carriage 10. The guide rod 11, and the timing belt 12 connected to the driving pulley 13 are connected to the carriage 10. As a result, the recording head 3 is made movable along the guide rod 11 also in a direction indicated by arrow Y (main-scanning direction) which is parallel to the surface of the recording material 1 and which is perpendicular to the conveying direction X (that is, sub-scanning direction) of the recording material 1.

The ink jet recording apparatus 100 is provided with a control section (not shown) for controlling, based on the image recording information, a timing for driving the recording head 3 and a timing for driving the carriage 10. As a result, images based on the image recording information can be continuously formed in a predetermined region on the surface of the recording medium 1 that is being conveyed at a predetermined speed.

The maintenance unit 14 is connected to a pressure-reducing device (not shown) via a tube 15. Further, the maintenance unit 14 is connected to a nozzle section of the recording head 3, and has the function of absorbing ink from the nozzle of the recording head 3 with the interior of the nozzle of the recording head 3 being brought into a pressure-reduced state. Consequently, if desired, it is possible to remove excess ink adhering to the nozzle during the operation of the ink jet recording apparatus 100, and prevent evaporation of ink from the nozzle when the apparatus is in a state in which operation is stopped.

The present invention will be described in more detail by way of the following examples, but is not limited to the same.

EXAMPLES

[Preparation of Dispersing Liquid of Self-dispersible Pigment]

A solution containing 5 parts by mass of concentrated hydrochloric acid dissolved in 5.3 parts by mass of water is cooled down to 5° C., and 0.6 parts by mass of anthranilic acid is added thereto. The mixed solution is stirred while being further cooled, and a solution with 1.78 parts by mass of sodium nitrite added to 8.7 parts by mass of water is further added and mixed, and thereafter, stirred for 15 minutes. 20 parts by mass of carbon black having a surface area of 320 $m^2/g$ and a DBP oil absorption of 120 ml/ 100 g is added and mixed. Subsequently, the solution obtained is further stirred for 15 minutes. The processing pigments prepared are filtered with filter paper and washed with pure water, and thereafter, water is added to make the total amount 200 parts by mass. Then, the mixed solution is subjected to demineralization by means of a reverse osmosis membrane, and dispersed for ten minutes by an ultrasonic homogenizer (power: 300 W). Next, a 10% NaOH aqueous solution is added thereto until the pH of the dispersing liquid becomes 8. The mixed solution is further dispersed by the ultrasonic homogenizer for ten minutes, and thereafter, centrifugalized under a condition of 800 rpm×30 min. to prepare thereby a pigment water-soluble solution. The pigment solution prepared is subjected to dry-up processing, the solid content is measured, and the water content is adjusted so that the pigment concentration becomes 10%. Thus, a pigment dispersion of self-dispersible carbon black is obtained to which a hydrophilic group ($-COO^-Na^+$) is bonded at the surface via a phenyl group.

[Preparation of Black Ink]

Example 1

<Black Ink 1>

| | |
|---|---|
| pigment dispersing liquid (as above) | 40 parts by mass |
| propylene glycol | 12 parts by mass |
| glycerine | 10 parts by mass |
| diethyleneglycol monobutyl ether | 5 parts by mass |
| Surfynol 465 (nonionic surface active agent manufactured by Nisshin Chemical Industry Ltd.) | 1.5 parts by mass |
| poly N-vinyl acetamide (nonionic water-soluble polymer) | 3 parts by mass |
| ion exchange water | (balance) |

The pH of Black ink 1 is 8.1.

Example 2

<Black Ink 2>

| | |
|---|---|
| pigment dispersing liquid (as above) | 40 parts by mass |
| diethylene glycol | 10 parts by mass |
| glycerine | 10 parts by mass |
| Nonion E230 (manufactured by Nisshin Chemical Industry Ltd.; polyoxyethylene oleyl ether) | 1 part by mass |

-continued

| | |
|---|---|
| polyvinyl alcohol (nonionic water-soluble polymer) | 0.5 part by mass |
| ion exchange water | (balance) |

The pH of Black ink 2 is 8.2.

Comparative Example 1

<Black Ink 3>

| | |
|---|---|
| pigment dispersing liquid (as above) | 40 parts by mass |
| diethylene glycol | 10 parts by mass |
| glycerine | 5 parts by mass |
| isopropyl alcohol | 2 parts by mass |
| Surfynol 465 | 1 part by mass |
| ion exchange water | (balance) |

The pH of Black ink 3 is 7.5.

[Evaluation of Characteristics of Inks]

Of the black inks thus obtained, Black inks 1 and 2 are inks of the present invention containing a nonionic polymer, and Black ink 3 is the ink of the comparative example. These inks are evaluated for surface tension, viscosity, zeta potential, and for a particle size of the pigment (number-average particle size). The results are shown in the following Table 1.

Surface Tension of Ink:

In an atmosphere of 23° C. and 55% RH, each ink is measured for surface tension with a Wilhelmy's surface tension measuring device.

Viscosity of Ink:

Each ink is assessed for viscosity with a Reomat 115 (manufactured by Contraves), by charging an aqueous ink jet recording liquid in a measurement vessel and fitting the vessel in the apparatus in accordance with a given measuring method. The measurement is conducted under conditions of 23° C. and a shear rate of 1400 $s^{-1}$.

Zeta Potential:

Each ink is assessed for zeta potential with an ESA-8000 (Matec Applied Science), by charging the measurement cell with 400 ml of ink jet recording ink and immersing a measuring probe in the ink by a specified amount in accordance with a given measuring method. Particle size (number-average particle size) of pigment:

The particle size of dispersed particles is measured by using a microtack UPA particle size analyzer 9340 (manufactured by Leeds & Northrup) without diluting the ink. As the parameters to be inputted during the measurement, a viscosity of the test ink is adopted as the viscosity and a concentration of the coloring material is adopted as the concentration of the dispersed particles.

Number of Coarse Particles:

Each ink is evaluated for the number of coarse particles using Accusizer TM 770 Optical Particle Sizer (manufactured by Particle Sizing Systems Inc.) in accordance with a given measuring method.

[Evaluation of Storage Stability of Ink]

The inks obtained are each measured for storage stability in the following manner.

Black inks 1, 2, and 3 are each injected into a sample tube, and 5 cycles of 60° C. for 2 hours and of −20° C. for 2 hours are carried out. Before and after the heat and cold cycles, the number of coarse particles in each ink having a particle size of 0.5 μm or more is measured. The standards used for evaluation are as below.

A: a variation ratio in the number of coarse particles is within or equal to ±10%.

B: a variation ratio in the number of coarse particles is more than ±10%, and within or equal to ±30%.

C: a variation ratio in the number of coarse particles is more than ±30%.

The results are shown in Table 1.

TABLE 1

| | surface tension [mN/m] | viscosity (mPas) | zeta potential (mV) | number-average particle size [nm] | number of coarse particles having a particle size is 0.5 μm or more (×10$^{10}$) | ink storage stability |
|---|---|---|---|---|---|---|
| Example 1 (Black ink 1) | 31.0 | 3.2 | −21.2 | 82.4 | 3.3 | A |
| Example 2 (Black ink 2) | 41.2 | 3.4 | −18.3 | 74.5 | 2.5 | A |
| Comparative Example 1 (Black ink 3) | 32.7 | 2.3 | −17.2 | 71.7 | 2.8 | B |

As is revealed in Table 1, the ink jet recording inks of the present invention are excellent in terms of storage stability.

[Preparation of Other Color Inks]

<Cyan Ink 1>

| | |
|---|---|
| C.I. Direct Blue-199 | 3 parts by mass |
| diethylene glycol | 20 parts by mass |
| diethylene glycol monobutyl ether | 5 parts by mass |
| Surfynol 465 | 1 part by mass |
| potassium acid phthalate | 5 parts by mass |
| sodium hydroxide | 0.01 part by mass |
| ion exchange water | (balance) |

The pH of Cyan ink 1 is 4.5

<Cyan Ink 2>

| | |
|---|---|
| C.I. Direct Blue-199 | 3 parts by mass |
| diehtylene glycol | 20 parts by mass |
| diehtylene glycol monobutyl ether | 5 parts by mass |
| Surfynol 465 | 1 part by mass |
| calcium nitrate/tetrahydrate (polyvalent metal salt compound, producing a polyvalent metal ion $Ca^{2+}$ in the ink) | 3 parts by mass |
| ion exchange water | (balance) |

The pH of Cyan ink 2 is 7.1.

<Cyan ink 3>

| | |
|---|---|
| C.I. Direct Blue-199 | 3 parts by mass |
| diethylene glycol | 20 parts by mass |
| diethylene glycol monobutyl ether | 5 parts by mass |
| Surfynol 465 | 1 part by mass |
| ion exchange water | (balance) |

The pH of Cyan ink 3 is 7.6.

<Magenta ink 1>

| | |
|---|---|
| M-377 (manufactured by Ilford AG) | 3 parts by mass |
| diethylene glycol | 20 parts by mass |
| diehtylene glycol monobutyl ether | 5 parts by mass |
| Surfynol 465 | 1 part by mass |
| potassium acid phthalate | 3 parts by mass |
| sodium hydroxide | 0.005 part by mass |
| ion exchange water | (balance) |

The pH of Magenta ink 1 is 4.5.

<Magenta Ink 2>

| | |
|---|---|
| M-377 (manufactured by Ilford AG) | 3 parts by mass |
| diethylene glycol | 20 parts by mass |
| diehtylene glycol monobutyl ether | 5 parts by mass |
| Surfynol 465 | 1 part by mass |
| calcium nitrate/tetrahydrate (polyvalent metal salt compound, producing a polyvalent metal ion $Ca^{2+}$ in the ink) | 3 parts by mass |
| ion exchange water | (balance) |

The pH of Magenta ink 2 is 7.4.

<Magenta Ink 3>

| | |
|---|---|
| M-377 (manufactured by Ilford AG) | 3 parts by mass |
| diethylene glycol | 20 parts by mass |
| diethylene glycol monobutyl ether | 5 parts by mass |
| Surfynol 465 | 1 part by mass |
| ion exchange water | (balance) |

The pH of Magenta ink 3 is 7.4.

<Yellow Ink 1>

| | |
|---|---|
| C.I. Direct Yellow-132 | 2 parts by mass |
| diethylene glycol | 20 parts by mass |
| diethylene glycol monobutyl ether | 5 parts by mass |
| Surfynol 465 | 1 part by mass |
| potassium acid phthalate | 3 parts by mass |
| sodium hydroxide | 0.005 parts by mass |
| ion exchange water | (balance) |

The pH of Yellow ink 1 is 4.4.

<Yellow Ink 2>

| | |
|---|---|
| C.I. Direct Yellow-132 | 2 parts by mass |
| diethylene glycol | 20 parts by mass |
| diethylene glycol monobutyl ether | 5 parts by mass |
| Surfynol 465 | 1 part by mass |
| calcium nitrate/tetrahydrate (polyvalent metal salt compound, producing a polyvalent metal ion $Ca^{2+}$ in the ink) | 3 parts by mass |
| ion exchange water | (balance) |

The pH of Yellow ink 2 is 7.5.

<Yellow Ink 3>

| | |
|---|---|
| C.I. Direct Yellow-132 | 2 parts by mass |
| diethylene glycol | 20 parts by mass |
| diethylene glycol monobutyl ether | 5 parts by mass |
| Surfynol 465 | 1 part by mass |
| ion exchange water | (balance) |

The pH of Yellow ink 3 is 7.5.

Next, the black inks of the present invention prepared during Examples 1 and 2, and during Comparative Example 1 are evaluated by using them for printing with a prototype ink jet printer (a piezoelectric ink jet type). The results of the evaluation are shown in the Table 2.

Example 3, Example 4 and Comparative Example 2

Further, ink sets having combinations of Black inks 1 to 3, and the various color inks are evaluated.

The combinations of inks of the ink set and the results of evaluation are set out in Table 2.

[Optical Density]

A black 100% coverage pattern is printed on FX-L Paper (manufactured by Fuji Xerox Co., Ltd.) and optical density is measured with an X-rite 404 (manufactured by X-rite Co., Ltd.). Further, in the four-color ink set, a black ink is printed on an overlapping portion of a 15% coverage pattern of each of the color inks of cyan, magenta and yellow. The standards used for evaluation are as follows:

A: 1.3 or more
B: more than or equal to 1.2 and less than 1.3
C: less than 1.2

[Abrasion Resistance]

A 100% coverage pattern is printed on FX-L paper (manufactured by Fuji Xerox Co., Ltd.), the printed matter is left for 24 hours and then subjected to sensory evaluation by means of rubbing with a finger. The standards used for evaluation are as follows:

A: no wear mark is found, or only very small wear marks are found.
B: some wear marks are found.
C: wear marks are conspicuous.

TABLE 2

| | | optical density | abrasion resistance |
|---|---|---|---|
| Example 1 | Black ink 1 | A | A |
| Example 2 | Black ink 2 | A | A |

TABLE 2-continued

|  |  | optical density | abrasion resistance |
|---|---|---|---|
| Example 3 | Black ink 1 + Cyan ink 1 + Magenta ink 1 + Yellow ink 1 | A | A |
| Example 4 | Black ink 1 + Cyan ink 2 + Magenta ink 2 + Yellow ink 2 | A | A |
| Comparative Example 1 | Black ink 3 | C | B |
| Comparative Example 2 | Black ink 1 + Cyan ink 3 + Magenta ink 3 + Yellow ink 3 | B | B |

As revealed in Table 2, it is evident from Example 1 and Example 2, which are the inks of the present invention, and from Example 3 and Example 4, in both of which the ink set of the present invention is used, that each leads to the formation of images with a high optical density and excellent abrasion resistance. On the contrary, the ink of Comparative Example 1 containing no nonionic polymer has low storage stability and displays a deterioration in the optical density of images obtained. Further, even when the black ink of the present invention is used, the ink set of Comparative Example 2, including combinations of other color inks, but containing no polyvalent metals and having almost no difference in pH is inferior to Examples 3 and 4, both in terms of optical density and in the abrasion resistance of images.

Accordingly, the present invention provides a pigment-dispersion ink jet recording ink having high optical density and excellent storage stability, an ink set containing the ink, and an inkjet recording method and apparatus using the ink and the ink set. Specifically, the present invention provides a pigment-dispersion ink jet recording ink that does not cause clogging in an ink flow channel or in a nozzle section at the time of printing, and moreover, has excellent printing characteristics such as fixing strength, water resistance and light fastness, an ink set including the ink, and an ink jet recording method and apparatus using the ink and the ink set.

What is claimed is:

1. An ink jet recording ink set including at least three color inks of cyan, magenta and yellow, and a black ink,
    wherein the black ink comprises water, a pigment that is self-dispersible in water, a water-soluble organic solvent, and a nonionic polymer, and a difference in pH between at least one of the color inks, and the black ink is about 1.5 or more.

2. The ink jet recording ink set according to claim 1, wherein an amount of the pigment that is self-dispersible in water is in a range of about 0.3% by mass to about 20% by mass relative to the total mass of the ink.

3. An ink jet recording method in which an image is recorded by discharging onto a surface of a recording material each ink of the ink jet recording ink set according to claim 1.

4. An ink jet recording apparatus using the ink jet recording ink set according to claim 1, comprising a liquid discharging member that applies to a surface of a recording material each ink of the ink jet recording ink set.

5. The ink jet recording apparatus according to claim 4, wherein the liquid discharging member is an ink head of a thermal ink jet type, or of a piezoelectric ink jet type.

* * * * *